W. NOBLE.
METHOD OF MAKING FLEXIBLE SLEEVE VALVES.
APPLICATION FILED JUNE 3, 1919.
1,383,747.
Patented July 5, 1921.
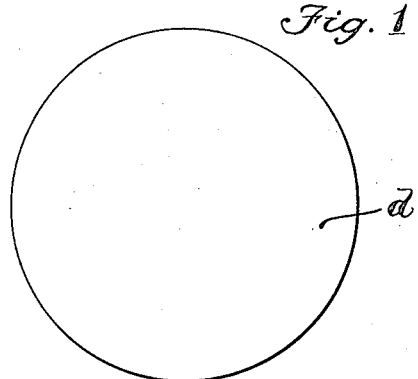
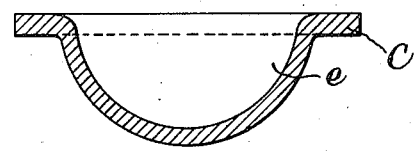
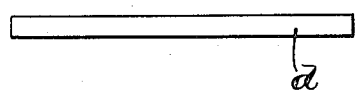
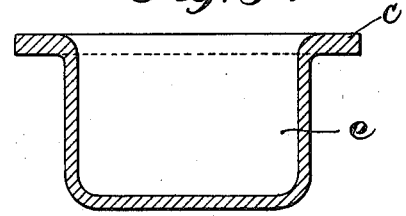
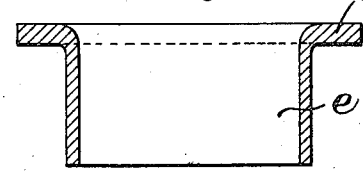
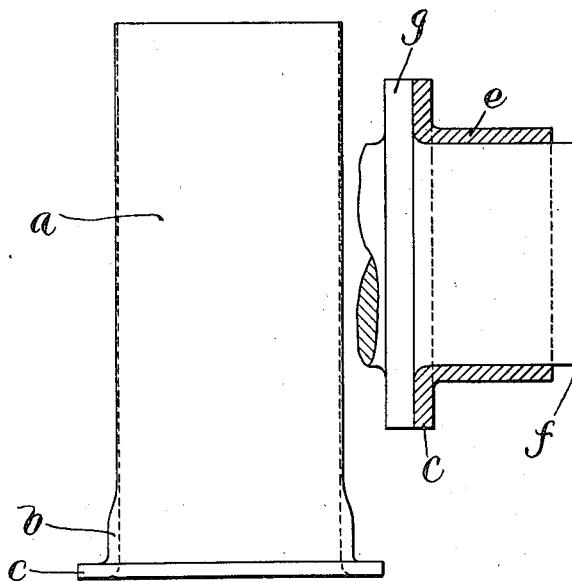
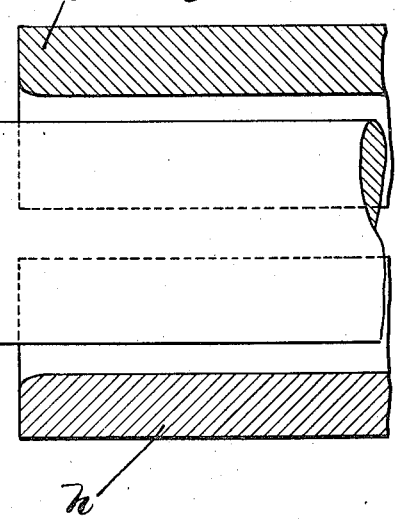
Inventor
Warren Noble
by Wright, Brown, Quinby & May
Attorneys

UNITED STATES PATENT OFFICE.

WARREN NOBLE, OF PROVIDENCE, RHODE ISLAND, ASSIGNOR TO N. C. L. ENGINEERING CORPORATION, OF PROVIDENCE, RHODE ISLAND, A CORPORATION OF NEW YORK.

METHOD OF MAKING FLEXIBLE SLEEVE-VALVES.

1,383,747.      Specification of Letters Patent.      Patented July 5, 1921.

Application filed June 3, 1919. Serial No. 301,530.

*To all whom it may concern:*

Be it known that I, WARREN NOBLE, a subject of the King of Great Britain, residing at Providence, in the county of Providence and State of Rhode Island, have invented new and useful Improvements in Methods of Making Flexible Sleeve-Valves, of which the following is a specification.

My present invention is concerned with a method of making sleeve valves adapted to be used in internal combustion motors and other associations for controlling the opening and closing of ports through which fluid may pass. In an application filed by me May 12, 1919, Serial No. 296,391 I have disclosed a sleeve adapted for the purposes above indicated, and other purposes, which is made of metal and the walls of which are of such extreme thinness that they are flexible, whereby such walls may be expanded by the pressure of fluid in the interior space of the valve into tight contact with the surrounding walls and with the boundaries of a port or ports in such walls, or into sealing contact with the cylinder walls in the case of an internal combustion motor; by which such a sleeve valve may be enabled to conform itself to local departures from perfect truth circumferentially or longitudinally of the cylinder or other casing in which the valve is confined, and by which various other useful effects are obtained. In my earlier application above identified I have disclosed the characteristics and some of the uses and advantages of such a flexible walled sleeve valve. My present purpose is to protect a method by which sleeve valves of the sort there disclosed and here refered to may be made rapidly and in large quantities with low production cost and of exceptionally satisfactory character as to truth, strength, and surface finish. The walls of sleeve valves as I have thus made them are in some cases as thin as eight or ten thousandths of an inch, and may have greater thickness depending upon the pressures which they are required to withstand and the areas of the openings over which they are required to extend without support, it being necessary that the valve wall should have sufficient strength to resist rupture or substantial distortion in that part which extends unsupported across a port or other opening where the opposite sides of the valve wall are exposed to different pressures; it being possible by the method I am about to describe to reduce the wall of the sleeve valve to practically any desired dimension or thickness.

I will now describe the method in which the present invention resides, making reference in connection with this description to the accompanying drawings which show the original blank, the finished product, and some of the stages through which the blank passes in being converted into the finished product. In these drawings, Figure 1 is a plan view of the blank, Fig. 2 an edge view or elevation thereof, Fig. 3 a side view of the valve finished except for the cutting of parts; and Figs. 4, 5, 6, and 7 are sectional views illustrating the principal successive steps performed in converting the blank into a finished article.

Before describing the method in detail I will note that the finished product shown in Fig. 3 is a sleeve valve *a* open at both ends and having extremely thin walls throughout the greater part of its length, but with the wall adjacent at one end of substantial thickness as shown at *b* and having an outwardly extending flange *c*. The thick part of the wall and the flange *c* are provided for securing or mounting thereon means by which the valve may be operated, as for example, a gear for rotating it, or a collar or lug by which power may be applied to reciprocate it. For certain purposes the walls of the sleeve valve may be cut to form ports or openings, but the cutting of such openings is a step subsequent to that of making the sleeve valve according to the present method, wherefore the openings are not shown in these drawings.

In performing this method I first provide a blank *d* shown in Figs. 1 and 2, which may be of any outline, but is preferably circular in order that its edge portion may without subsequent trimming furnish the flange *c* before described. This blank is of any material capable of being worked by drawing and swaging methods, which means that it must be ductile and tough. It must also have ample strength to sustain the pressures to which the finished valve will be subjected. Thus for practical purposes it is necessary to use metal, either in the elemental condition or as an alloy; but many different metals and alloys are suitable, including steel, bronze, aluminum, cupro-nickel and others having more or less similar qualities of strength and ductility within wide limits.

This blank is next drawn to form a flanged cup by press operations, in as many steps as may be necessary according to the diameter and depth required in any particular case. Two of the operations are shown in Figs. 4 and 5 respectively, the latter figure showing the cup $e$ after it has been drawn to the depth or length needed for the particular case here illustrated. In thus drawing the cup I may use already known and used methods for producing like articles. The next step is to remove the bottom of the cup, which may be done in any desired one of various ways, which leaves a short tube as shown in Fig. 6 having relatively thick walls and an end flange. The wall thickness of this tube is, of course, determined by the original thickness of the blank and the extent to which the drawing process is carried on. I may state that in practice a thickness of wall at this stage of about one-eighth of an inch is suitable for some sizes of valve.

The tube so made, after having been annealed if necessary and cleaned of scale, is then placed on an arbor or mandrel $f$ which has a highly polished and accurate surface throughout its entire length of the exact diameter desired for the bore of the sleeve. It also has a flange or collar $g$ against which the flanged end of the tube abuts. The cup from which the tube is made is of course drawn in the first place enough larger than the arbor to enable it to be slipped freely on the latter. Then the arbor with the tube $e$ on it is entered between swaging dies $h, h$ and subjected to a hammering action administered by said dies, being fed forward as the swaging progresses. These dies lie upon opposite sides of the arbor and are longitudinally grooved or recessed to enable them to embrace the greater part of the circumference of the arbor as shown in Fig. 7 by dotted lines, the radius of these grooves or longitudinal recesses being somewhat greater than the outer surface of the tube intended to be produced. Such dies may be parts of a rotary swaging machine of which various types are now well know and in use. In one type of such machine which I may use the jaws are mounted in a diametral slot in a rotating head or shaft which is coaxial with the arbor $f$. The dies are adapted to move in the slot of such head toward and away from the axis, and they are alternately pressed inward and released by rolls which are confined in a raceway surrounding said head or shaft and formed or mounted in a rigid annular holder. Such rolls have the relation of a roller bearing to the die-carrying head, and they also apply frequently repeated pressing impulses to the dies through press blocks which lie against the outer sides of the dies and have external cam surfaces extending beyond the periphery of the die-carrying head slightly into the paths of the rolls. These cam surfaces of the press members have the effect, when passing across the rolls, of forcing the dies within a given distance of the surface of the arbor, which distance is that of the thickness required to be given to the wall of the work piece in one swaging operation. The die-carrying head being rapidly rotated, the tube $e$ is subjected to a hammering action by the dies which reduces the thickness of its wall and at the same time elongates it.

One swaging operation may be sufficient to reduce the tube wall thickness to that required in the finished sleeve valve, but in many cases two or more such operations will be required, each successive operation being performed in a swaging machine where the dies approach closer to the surface of the arbor than in the preceding machine. Where a number of such operations are carried out, the tube or sleeve may be annealed if necessary between operations.

Whatever the number of such swaging operations may be, the ultimate result is to lengthen the wall of the tube and reduce its thickness to the required degree, which will usually range between eight and twenty thousandths of an inch. In any event, however, the wall is so thin that it is flexible within the limits required of such a sleeve valve under the conditions in which it is used. Desirable and valuable effects of the method described are that the inner and outer surfaces of the sleeve valve are brought to the exact diameters required, the inner diameter being determined by the arbor, and the outer by the prescribed movements of the dies; that these surfaces of the sleeve valve are given a smooth polished finish by their contact with the polished surfaces of the arbor and dies, respectively, and by the burnishing effect of the hammer blows from the dies; and that the metal of the sleeve valve is condensed by the swaging action and is made stronger, harder, and of finer grain than the metal of the original blank, and is entirely free from pores. If any defects existed in the metal originally, such as small holes or pores and irregularity of texture, such defects are corrected by the swaging operation, provided of course that the metal is of reasonably good quality to start with. The sleeve valve delivered from the final swaging operation is complete and ready for use except for such trimming and cutting of ports or other apertures as may be needed to adapt it to its intended place of use. That is, there is no further grinding, polishing, or turning operation of any sort required.

While sleeve valves made in accordance with this invention as described are ordinarily preferable and cylindrical, and may be made exactly cylindrical within minute limits of accuracy, essentially the same method, within the scope of the claims, may be employed to produce sleeve valves of conical and other forms by appropriately forming the arbor and dies in accordance with the form to be produced.

What I claim and desire to secure by Letters Patent is:—

1. The method of making a flexible sleeve valve which consists in providing a tube, placing such tube upon and around an arbor, and swaging the tube by the action of external dies which are caused to hammer on the exterior of the tube, thereby reducing the thickness of the tube wall and conforming its inner surface to the surface of the arbor.

2. The method of making a flexible metal sleeve valve which consists in providing a tube of metal having a relatively thick wall, placing such tube upon and around an arbor having an accurate polished surface of exactly determined size, and hammering the exterior of said tube by polished swaging dies with a rotary action, thereby conforming the inner surface of the tube to the surface of the arbor, reducing the thickness of the wall of the tube and elongating such wall, condensing the metal of the wall, and bringing its exterior surface to a predetermined diameter.

3. The method of making a flexible sleeve valve which consists in providing a flat blank of metal, drawing such blank into the form of a cup, cutting off the bottom or end wall of said cup, leaving a substantially cylindrical tube, placing said tube upon an arbor, and hammering the exterior of such tube by swaging dies with a relatively rotating action about the axis of the arbor.

4. The method of making a sleeve valve having an interior diameter of exactly determined size and the walls of which are of such thinness as to be flexible and are continuous, dense and non-porous, which consists in providing a relatively short and thick-walled metal tube having an exterior flange at one end, placing such tube on an arbor having exactly the diameter required for the interior of the valve, and hammering all over the outside of the tube from a zone of predetermined width adjacent said flange to the end opposite to the flange until its interior is conformed to the mandrel and its wall is reduced to the predetermined thickness.

5. The method of making a sleeve valve having an interior diameter of exactly determined size and the walls of which are of such thinness as to be flexible and are continuous, dense and non-porous, which consists in providing a relatively short and thick-walled metal tube having an exterior flange at one end, placing such tube on an arbor having exactly the diameter required for the interior of the valve, and hammering all over the outside of the tube from a zone of predetermined width adjacent said flange to the end opposite to the flange until its interior is conformed to the mandrel and its wall is reduced to the predetermined thickness, therafter trimming the resulting sleeve valve to the required length and cutting a port in its side.

In testimony whereof I have affixed my signature.

WARREN NOBLE.